United States Patent [19]

Lewis

[11] 3,739,651
[45] June 19, 1973

[54] VARIABLE SPEED PULLEY ASSEMBLY
[75] Inventor: William L. Lewis, Sanford, N.C.
[73] Assignee: Roberts Company, Sanford, N.C.
[22] Filed: May 5, 1971
[21] Appl. No.: 140,320

[52] U.S. Cl.................. 74/230.17 M, 74/230.17 C
[51] Int. Cl........................................... F16h 55/52
[58] Field of Search ............ 74/230.17 M, 230.17 C

[56] References Cited
UNITED STATES PATENTS

| | | | |
|---|---|---|---|
| 3,618,415 | 11/1971 | Ruprecht et al. | 74/230.17 M |
| 2,678,566 | 5/1954 | Oehrli | 74/230.17 M |
| 2,812,666 | 11/1957 | Huck | 74/230.17 C |
| 3,175,409 | 3/1965 | Macy | 74/230.17 C |
| 3,180,164 | 4/1965 | Chung | 74/230.17 C |
| 3,250,553 | 5/1966 | Detwiler | 74/230.17 C |

Primary Examiner—C. J. Husar
Attorney—David Rabin

[57] ABSTRACT

A variable pitch pulley includes flanges associated with inner and outer sleeves concentrically mounted for axial displacement relative to each other. The flange sleeves are supported by non-metallic inserts which serve as bearing surfaces between adjacent members displaceable relative to each other and also serve to key adjacent members together to prevent angular relative displacement therebetween.

7 Claims, 4 Drawing Figures

PATENTED JUN 19 1973  3,739,651

INVENTOR
WILLIAM L. LEWIS

VARIABLE SPEED PULLEY ASSEMBLY

BRIEF SUMMARY AND OBJECTS OF THE INVENTION

This invention relates to variable speed pulleys and particularly to a pulley construction which overcomes the problems of fretting, corrosion and excessive wear normally associated with conventional non-lubricated pulleys.

The pulley construction of this invention generally comprises flanges and associated sleeve members adapted to be moved apart against a biasing force such that a belt can assume various positions radially with respect to the axis of the pulley construction. The sleeve members, along with a hub or stem member, are concentrically mounted. Non-metallic inserts are located between the sleeve and stem members for serving as bearings between the members and for keying the members together to prevent angular relative displacement therebetween. Such inserts between the opposed sliding surfaces of the members permits the members to withstand continued operation without becoming scored, corroded or otherwise damaged due to excessive wear.

One of the primary objects of the invention is the provision of a variable speed pulley which eliminates fretting, corrosion and excessive wear between the sliding components.

Another object of the invention is the provision of a variable speed pulley having an improved non-metallic driving means for preventing angular relative movement between sliding members.

A further object of the invention is the provision of non-metallic bearing inserts between the sliding members.

Still another object of the invention is the provision of a variable speed pulley constructed and arranged to withstand continued operation with a minimum amount of maintenance.

Other objects and advantages of the invention will become apparent during the course of the following detailed description.

DETAILED DESCRIPTION OF THE INVENTION

Figure 1:
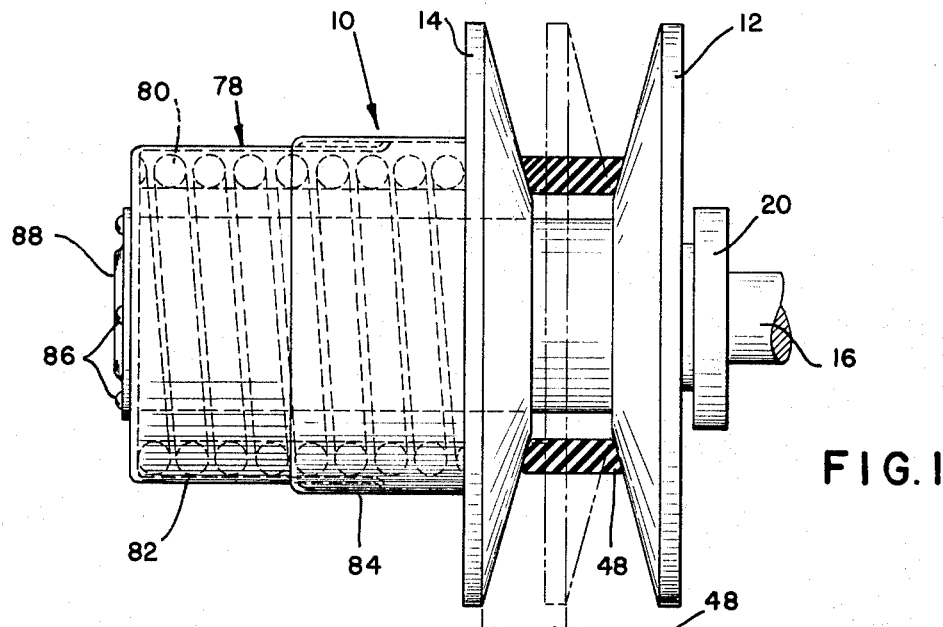
FIG. 1 is a side elevational view of the variable speed pulley of the present invention illustrating the opened and closed positions of the pulley flanges.

Referring now to the drawing, the variable speed pulley construction 10 includes a pair of flange members 12 and 14 mounted upon a shaft 16. Normally the shaft 16 is driven by an electric motor or other suitable means and is restrained against angular movement relative to the pulley construction 10 by a key 18. The key 18 is secured to a tubular stem member 20 by a plurality of fasteners 22 and is received within a slot 24 within shaft 16.

A bushing 26 is disposed between the tubular stem member 20 and the shaft 16 for securing the stem to the shaft. A threaded collar 28 having a plurality of holes or openings 30 is received by a threaded portion 32 of the bushing 26. An end stop 34, disposed between the collar 28 and the end surface 36 of the tubular stem member 20, limits inward displacement of the collar 28. To fasten the stem 20 to the shaft 16, the collar 28 is displaced by engaging the holes 30 with a suitable means and rotating the collar 28 along the threaded portion 32 of bushing 26. This movement draws the bushing 26 into the stem member 20 causing a locking action due the engagement of the concial surface 38 of the bushing 26 with the tapered bore 40 of stem 20. The bushing 26 is provided with a plurality of axially extending slots 42 around the periphery for receiving the key 18. In addition the slots 42 make the conical end of the bushing sufficiently flexible so that it can be reduced in diameter to grip the shaft 16 upon rotation of the collar 28. This method of securing the pulley construction 10 to the shaft 16 has been found to be very satisfactory because the gripping surface extends up to one-half of the length of the bushing 26 and insures axial alignment of the assembly relative to the shaft.

Figure 2:
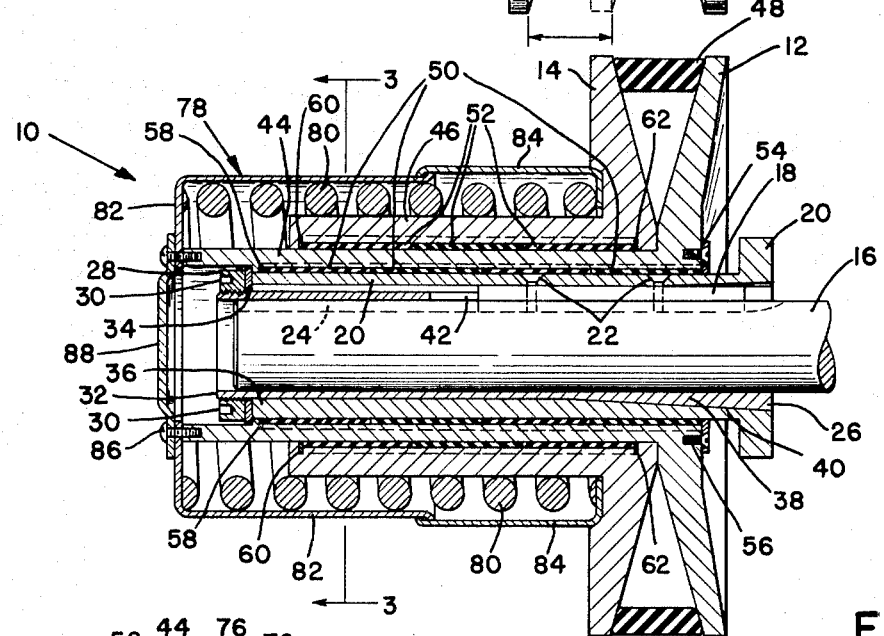
FIG. 2 is a cross sectional view of the variable pitch pulley of FIG. 1 with the pulley flanges in a closed position.
Figure 3:
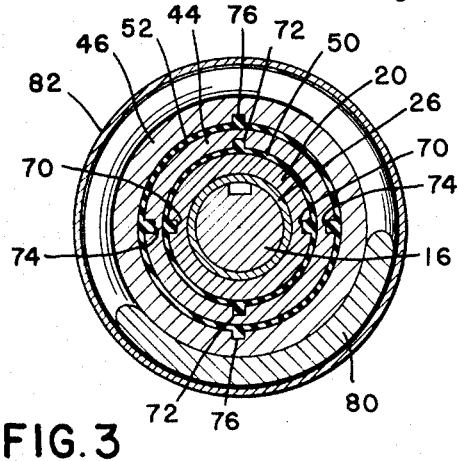
FIG. 3 is a cross sectional view taken along line 3—3 of FIG. 2.

Mounted on the stem member 20 is the inner flange 12 having an inner sleeve 44 extending longitudinally and concentric with stem 20 and the outer flange 14 having an associated outer sleeve 46 also extending longitudinally and concentric with the stem. The inner and outer flanges 12 and 14 consist primarily of frusto-conical shaped disks extending generally radially outwardly from their respective sleeves 44 and 46 and forming therebetween contact surfaces for a belt 48. The flanges are adapted to slide axially, relative to each other, whereby the belt 48 is at a maximum distance from the shaft, as shown by FIG. 2, and at a minimum distance from the axis of the shaft 16, as shown by FIG. 1.

In conventional non-lubricated variable pitch pulleys wherein the stem member or hub and the inner and outer sleeves of the flanges are in sliding contact and where metal keys are required to prevent angular relative rotation between elements, substantial difficulty has been encountered due to fretting and corrosion between adjacent sliding surfaces. These adverse conditions often create excessive wear and vibrations in the drive.

In the present pulley mechanism, non-metallic inserts 50 and 52 having been disposed between the stem 20 and inner sleeve 44, and between the inner sleeve 44 and outer sleeve 46, respectively, thus eliminating the need for lubrication between various parts and eliminating fretting and corrosion. The bearing insert 50 is slideably mounted on the tubular stem member 20 and is retained in position by a washer 54 secured to the flange 12 by screw means 56 and by a retaining ring 58 located in the inner sleeve 44 of flange 12 to insure movement of the bearing insert 50 with the inner sleeve 44. Similarly, the bearing insert 52 is slideably mounted on the outer surface of the inner sleeve 44 and retained in a fixed position relative to the outer sleeve 46 by retaining rings 60 and 62.

Figure 4:
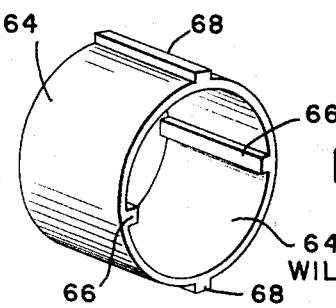
FIG. 4 is a perspective view of a bearing insert provided with key means.

Each of inserts 50 and 52 preferably is of the type illustrated by FIG. 4 which includes a shell 64 with integral, internally projecting key members 66 and externally projecting key members 68. The inserts 50 and 52, which may be formed of Delrin or other suitable materials, serve as non-metallic bearings between adjacent relatively displaceable parts and has non-metallic keys for preventing angular relative rotation between elements. The bearing and key arrangement shown with the internal 66 and external 68 keys disposed at 90° relative to each other is the preferred embodiment. However, it is also possible to locate the internal and external keys in the same radial plane. Further, the keys may be of various configurations.

The internal keys 66 of insert 50 slide in receiving keyways 70 and the tubular stem 20 while the external keys 68 are received within axially extending keyways 72 in the inner sleeve 44. During rotation of shaft 16, torque is transmitted through keys 66 and to the shell 64 and then into the external keys 68 and to the inner sleeve 44. Similarly, the internal and external keys 66 and 68 of insert 52 are received within keyways 74 and 76 and the outer portion of inner sleeve 44 and in the inner portion of outer sleeve 46, respectively. The relatively thin shell 64, of each non-metallic insert serves as an excellent power transmitting material when supported between inner and outer walls of cooperating members, such as the sleeves 44, 46 and stem 20.

Not all of the torque is transmitted to the outer keys 68 since the flexible nature of the thin shell 64 creates a distribution of pressure between the insert and the outer member, member 44 or 46, which pressure is higher the closer to the internal keys 66. This tends to bind the insert and the outer member thus transmitting some of the torque.

The two flanges 12 and 14 are urged toward each other by a spring assembly 78 consisting of a helical coil spring 80 enclosed in a telescopic shell formed by a generally cup-shaped member 82 and outer cylindrical shell 84 overlapping the cup-shaped element. The cylindrical shell 84 is received by the outer flange 14 while the cup-shaped member 82 is secured to the inner flange 12 by a plurality of fasteners 86. An end cap 88 closes the end of the telescopic shell.

An increase in pressure applied by belt 48 on flanges 12 and 14 tends to separate the flanges, against the action of spring 80, forcing the belt to move from the FIG. 2 position to the FIG. 1 position. The flanges remain in this newly assumed position until a further change in pressure has been applied to the belt.

I claim:

1. A variable speed pulley assembly comprising an inner sleeve and an outer sleeve concentrically mounted with respect to each other, a belt engaging flange associated with each of said sleeves, the inner peripheral surface of said outer sleeve being spaced from the outer peripheral surface of said inner sleeve, each of said spaced sleeves having axially extending key receiving means, non-metallic, annular bearing means interposed between said inner and outer sleeves, said annular bearing means including an annular member having inner and outer peripheral portions in engagement with said inner and outer sleeves and key means integral with said annular member and extending axially of said annular member and said sleeves, said axially extending key means including keys projecting from the inner and outer peripheral surfaces of said annular member cooperatively engaging said key receiving means for transmitting angular forces from one sleeve to the other sleeve and for permitting axial sliding displacement while preventing angular displacement of said inner and outer sleeves relative to each other.

2. A variable speed pulley assembly as recited in claim 1, wherein the keys projecting from the opposite surfaces of the bearing means are disposed at 90° relative to each other.

3. A variable speed pulley assembly as recited in claim 2, and further including spring means for biasing said flanges toward each other.

4. A variable speed pulley assembly as recited in claim 3, and further including a tubular member for mounting upon a drive shaft and concentrically mounted with respect to said inner and outer sleeves, second annular bearing means interposed between said inner sleeve and said tubular member, and means for securing said tubular member to the shaft.

5. A variable speed pulley assembly as recited in claim 4, wherein opposed surfaces of said inner sleeve and said tubular member have parallel key receiving means formed therein, said second bearing means formed with integral keys for engaging said key receiving means for preventing angular relative movement between said inner sleeve and said tubular member.

6. A bearing insert adapted to be interposed between opposed surfaces of two concentrically mounted members having keyways therein to permit sliding movement of the members while preventing angular relative displacement between the members comprising, an annular, non-metallic shell member, key means, extending axially of said annular shell member, integral with said annular shell member and projecting from the inner and the outer peripheral surfaces of said shell member for engaging keyways of concentrically mounted members.

7. A bearing insert as recited in claim 6, wherein said key means includes a plurality of keys disposed at ninety degree angles relative to each other.

* * * * *